(No Model.)
S. R. PARKS.
PLUMBER'S VISE.
No. 568,543. Patented Sept. 29, 1896.
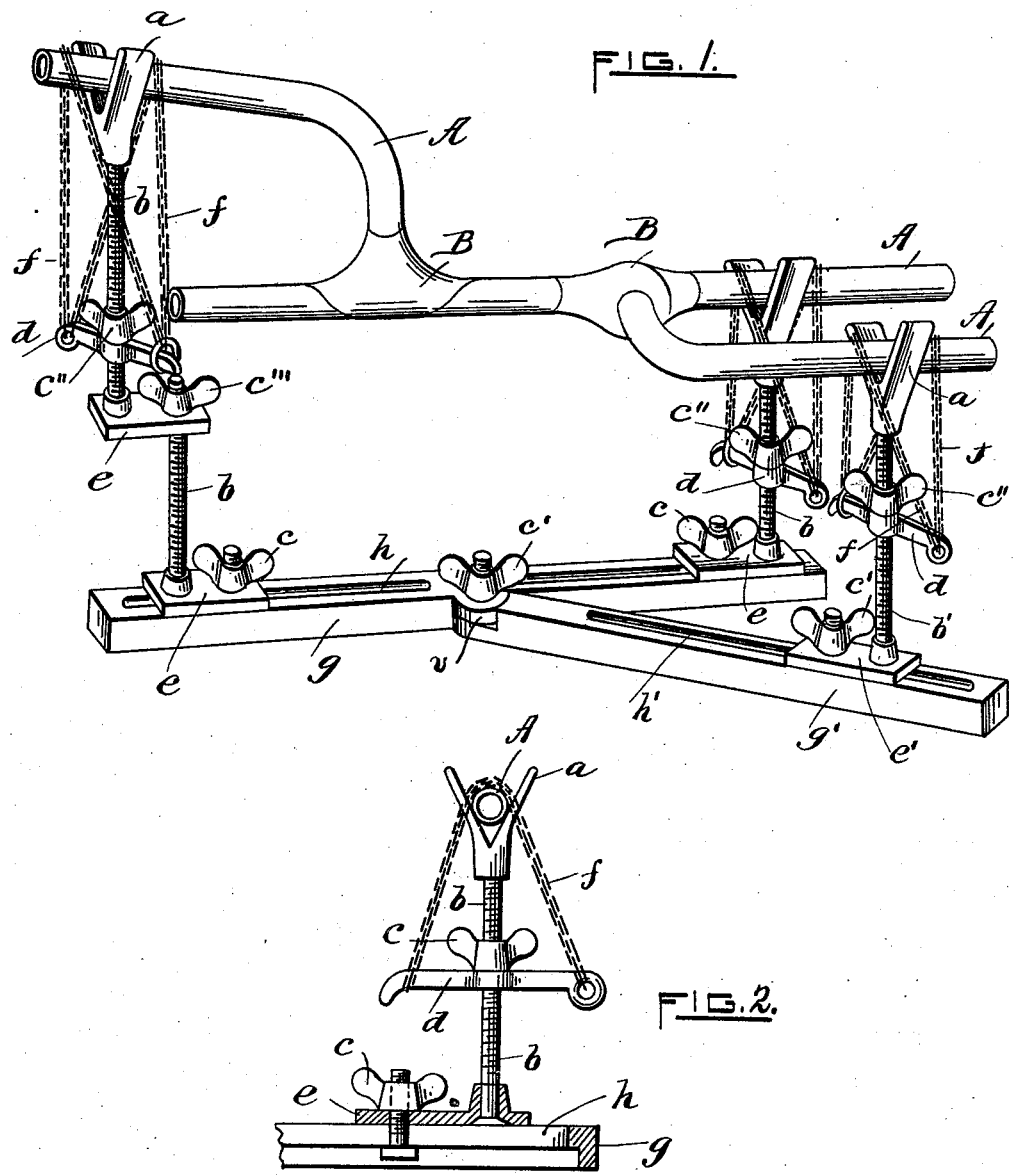
WITNESSES.
Charles T. Hannigan
Lillian J. Tuck
INVENTOR.
Samuel R. Parks
by James L. Jenks
Atty.

UNITED STATES PATENT OFFICE.

SAMUEL R. PARKS, OF PAWTUCKET, RHODE ISLAND.

PLUMBER'S VISE.

SPECIFICATION forming part of Letters Patent No. 568,543, dated September 29, 1896.

Application filed February 21, 1896. Serial No. 580,261. (No model.)

*To all whom it may concern:*

Be it known that I, SAMUEL R. PARKS, a citizen of the United States, residing at Pawtucket, in the county of Providence and State of Rhode Island, have invented certain new and useful Improvements in Plumbers' Vises; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in plumbers' vises in which adjustable Y-shaped standards are used in connection with a suitable base to hold a pipe or combinations of pipe firmly; and the object of my invention is to provide an instrument in which a single piece or a number of pieces of pipe may be quickly and firmly secured and held in any desired position for ease and convenience in soldering, jointing, &c. This purpose is secured by the mechanism shown in the accompanying drawings, in which—

Figure 1 is a perspective view of my invention holding three separate pieces of pipe united by wiped joints, and Fig. 2 a detail view of one standard.

The same parts are shown by the same letters throughout.

In Fig. 1, $g$ is a metallic base, slotted, as shown at $h$, to permit of the adjustment at any point of the feet $e\ e$, carrying the threaded standards $b\ b$. Connected to $g$ by a common elbow-joint is the supplementary base $g'$, also slotted, as seen at $h'$. The threaded standards $b\ b\ b'$ are not fixed in the feet $e\ e\ e'$, but are screwed into the same, so as to be readily moved up or down within certain limits. The arm $g'$, as appears from the drawings, may be adjusted at any angle with $g$ by the joint $v$ and the thumb-nut $c'$. The bolts shown passing through the thumb-nuts $c\ c\ c'$ serve to adjust and fix in position the feet $e\ e\ e'$ at any desired point on the bases $g\ g'$. Each of the standards $b\ b\ b'$ has firmly fixed upon its upper end the Y-shaped pieces $a\ a\ a$, which serve as rests for the pieces of pipe A A A.

$d\ d\ d$ are cross-bars sliding easily on the standards $b$ and held in position by the chains $f\ f$ and the thumb-nuts $c''\ c''$. The chains $f\ f$ pass upward over the pipe to be secured and are attached at the lower end to the cross-bars $d\ d$.

B B show joints made while the pipe is secured by my device.

To fix the pipe in the desired position, it is only necessary to place it in the Y-shaped support $a$, bring the chain $f$ over the top, and slip the ring at the end of $f$ over the bent end of the cross-bar $d$. Then the bar $d$ is forced downward by the thumb-nut $c''$ until any desired degree of firmness is attained.

Although my drawings show but one supplementary base $g'$, more than one may be attached to the base $g$, as occasion may require.

As will be seen from the drawings, my invention will accommodate and hold almost any possible combination of pipes, and where many pipes are to be held at once in one system two or more of my vises may be used together. The left-hand portion of Fig. 1 shows how two standards may be used together where extra height is desired.

Having now described my invention, what I claim, and desire to secure by Letters Patent, is—

1. A plumber's vise consisting of a threaded standard terminating at its upper end in a Y-shaped rest, a cross-bar sliding on said standard, a chain or chains attached to the ends of said cross-bar and capable of being brought into juxtaposition to said Y-shaped rest, a thumb-nut threaded upon said standard and actuating said cross-bar and chain, and a suitable base supporting said standard, all substantially as set forth for the purpose specified.

2. A plumber's vise consisting of a slotted base having one or more supplementary bases attached thereto by a movable joint or joints; a sliding foot adjustable on said base and carrying an upright threaded standard terminating at its upper end in a Y-shaped rest; a cross-bar sliding on said standard; a double chain attached to each end of said cross-bar so that one loop of said chain shall lie on each side of said Y-shaped rest; and a thumb-nut threaded upon said standard and actuating said cross-bar and chain, all substantially as described.

In testimony whereof I affix my signature in presence of two witnesses.

SAMUEL R. PARKS.

Witnesses:
LELLAN J. TUCK,
JAMES E. BRENNAN.